US006901260B1

(12) United States Patent
Xin

(10) Patent No.: US 6,901,260 B1
(45) Date of Patent: May 31, 2005

(54) DIFFERENTIAL GPS AND/OR GLONASS WITH WIRELESS COMMUNICATIONS CAPABILITY

(75) Inventor: Wayne Xin, Aliso Viejo, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/518,678

(22) Filed: Mar. 3, 2000

(51) Int. Cl.⁷ .......................... H04Q 7/20; H04B 7/185
(52) U.S. Cl. .................... 455/456.1; 455/422.1; 455/404.1; 342/357.06; 342/357.1
(58) Field of Search .................... 455/456, 457, 455/422, 12.1, 404, 407, 414, 421, 456.1, 422.1, 404.1; 342/357.01, 357.02, 357.03, 357.04, 357.05, 357.06, 357.1, 358

(56) References Cited

U.S. PATENT DOCUMENTS 6,246,376 B1 * 6/2001 Bork et al. .................. 343/760
6,275,707 B1 * 8/2001 Reed et al. .............. 455/456.3
6,295,455 B1 * 9/2001 Fischer et al. ........... 455/456.2
6,580,372 B1 * 6/2003 Harris ..................... 340/686.6

FOREIGN PATENT DOCUMENTS

EP          0 978728 A1    9/2000
WO         WO 99/54753    10/1999

* cited by examiner

Primary Examiner—David Hudspeth
Assistant Examiner—S. Smith

(57) ABSTRACT

A differential GPS or GLONASS system (collectively referred to herein as a 'GPS system') is implemented for use by a base station of a wireless telephone system (e.g., by a cellular telephone base station). Using the differential GPS system, a differential location 'correction' factor is determined based on a difference between a received GPS location signal and a known fixed location of a GPS system receiver for the base station. A differential GPS correction signal containing the correction factor is transmitted to any or all cellular telephone users of that base station to allow the cellular telephones to improve the accuracy of location information independently measured by GPS receivers located in each of the cellular telephones. The differential GPS signal may be used to increase the accuracy of the GPS system, whatever the current accuracy of the GPS system, allowing practical implementation of an emergency telephone system such as a 911 system using a wireless system such as a cellular telephone system.

19 Claims, 3 Drawing Sheets

DIFFERENTIAL GPS AND/OR GLONASS WITH WIRELESS COMMUNICATIONS CAPABILITY

BACKGROUND OF THE INVENTION

1. Field of the Invention

This invention relates generally to wireless systems. More particularly, it relates to a wireless telephone system (e.g., a cellular telephone) which transmits location information to a called party.

2. Background of Related Art

Wireless telephone systems are becoming available everywhere, and are now in wide use by many people. A wireless telephone system such as a cellular telephone system allows users to make and receive telephone calls via a portable handset.

Many cellular telephone systems provide a public service by allowing a user to dial special telephone numbers to, e.g., report traffic accidents, call police, etc. Perhaps most importantly cellular telephone systems allow a user to dial an emergency telephone number such as '911'.

In a wireline system, a 911 telephone call includes call related information to the called party (e.g., a street address of the caller) allowing emergency personnel to rapidly arrive at the correct address. Address information is transmitted in a 911 capable system to the called emergency center regardless of the ability of the caller to speak, giving emergency personnel crucial identity and address information even in the most extreme emergency cases where the caller is unable to speak.

The functions of 911 systems have become well known in the wireline telephone system, but use of a 911 call using a wireless telephone such as a cellular telephone presents its own challenges. For instance, since cellular telephones are able to roam just about anywhere, address information is not indicative of the location of the cellular telephone at any one time. Thus, at best, when a 911 call is placed in conventional cellular telephone systems the location of the fixed component of the cellular telephone system, i.e., the location of the base station servicing the cellular telephone at the time of the 911 telephone call, is all the location information that can be transmitted to the emergency personnel. However, since base stations usually service cellular telephones within a very large area (e.g., many square miles), a 911 system is rather impractical using conventional cellular telephones.

A conventional solution which provides more useful location information to a called party includes a global positioning satellite (GPS) within a cellular telephone handset. FIG. 3 shows such a conventional cellular telephone 300 including cellular telephone functionality 302 combined with a GPS system 304. Using the GPS system in the cellular handset, location information can be determined using the GPS, then transmitted to a called party during a 911 telephone call.

A 911 system in a cellular telephone system carries great potential. For instance, a caller who is moving may stay on the line while emergency personnel are en route to reach them, and the cellular telephone may provide updated location information to the emergency personnel as the 911 caller moves.

Ordinarily, a GPS system is at best accurate to about 10–15 meters (e.g., 30 to 45 feet). Certain factors such as what is known as the ionosphere delay effect can affect the accuracy of the GPS system in any particular location at any particular time. In a wide-open area, a 10–15 meter accuracy is close enough for emergency personnel to locate the calling party. However, in many situations (e.g., in a crowded building, on a crowded street, etc.), a 15 meter may not direct emergency personnel.

To make matters worse, a GPS system may be adjusted to have less accuracy, e.g., about 100 meters (e.g., 300 feet). For instance, in the United States, the Department of Defense may adjust the GPS system using selective availability (SA) to have a less precise accuracy at any time (e.g., when the national interest outweighs commercial use of the GPS system).

Thus, the accuracy of the location of the user transmitted during a 911 call is limited to the accuracy of the GPS system at any one time. Moreover, as the accuracy of the GPS system is manipulated, so is the ability of emergency personnel to quickly locate persons making 911 telephone calls from GPS equipped cellular telephones. During such times, use of a GPS system to provide location information to emergency personnel during a 911 telephone call becomes somewhat impractical or useless.

There is a need for a wireless telephone system such as a cellular telephone system which is capable of transmitting more accurate location information to a called party or other emergency personnel not only when the GPS and/or Global Navigation Satellite System (GLONASS) systems are operating in a less accurate mode, but also when the GPS and/or GLONASS systems are operating in a typical accuracy mode (e.g., 10–15 meters).

SUMMARY OF THE INVENTION

In accordance with the principles of the present invention, in a wireless communications system, a base station location determining system comprises a satellite positioning system receiver, predetermined location coordinates of the satellite positioning system receiver, and a module which determines a difference between a location signal received by the satellite positioning system receiver and the predetermined location coordinates.

A method of improving an accuracy of a received navigational satellite signal in a cellular telephone handset in accordance with another aspect of the present invention comprises receiving location information from a navigational satellite system. A differential GPS correction signal relating to an error in the received location information is received. The location information and the differential GPS correction signal are combined to generate highly accurate location information.

A navigational system in accordance with the principles of the present invention comprises a satellite positioning system receiver, a a wireless communications front end, and a module adapted to output a corrected location signal comprising a location signal received by the satellite positioning system receiver and a correction factor received by the wireless communications front end.

A method of increasing accuracy of a navigational satellite system in a wireless communications device in accordance with yet another aspect of the present invention comprises receiving using cellular telephone functionality of the wireless communications device a differential GPS correction signal containing a location correction factor. A location of the wireless communications device is determined using a navigational satellite system portion of the wireless communications device. The location correction factor is combined with the determined location of the wireless communications device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
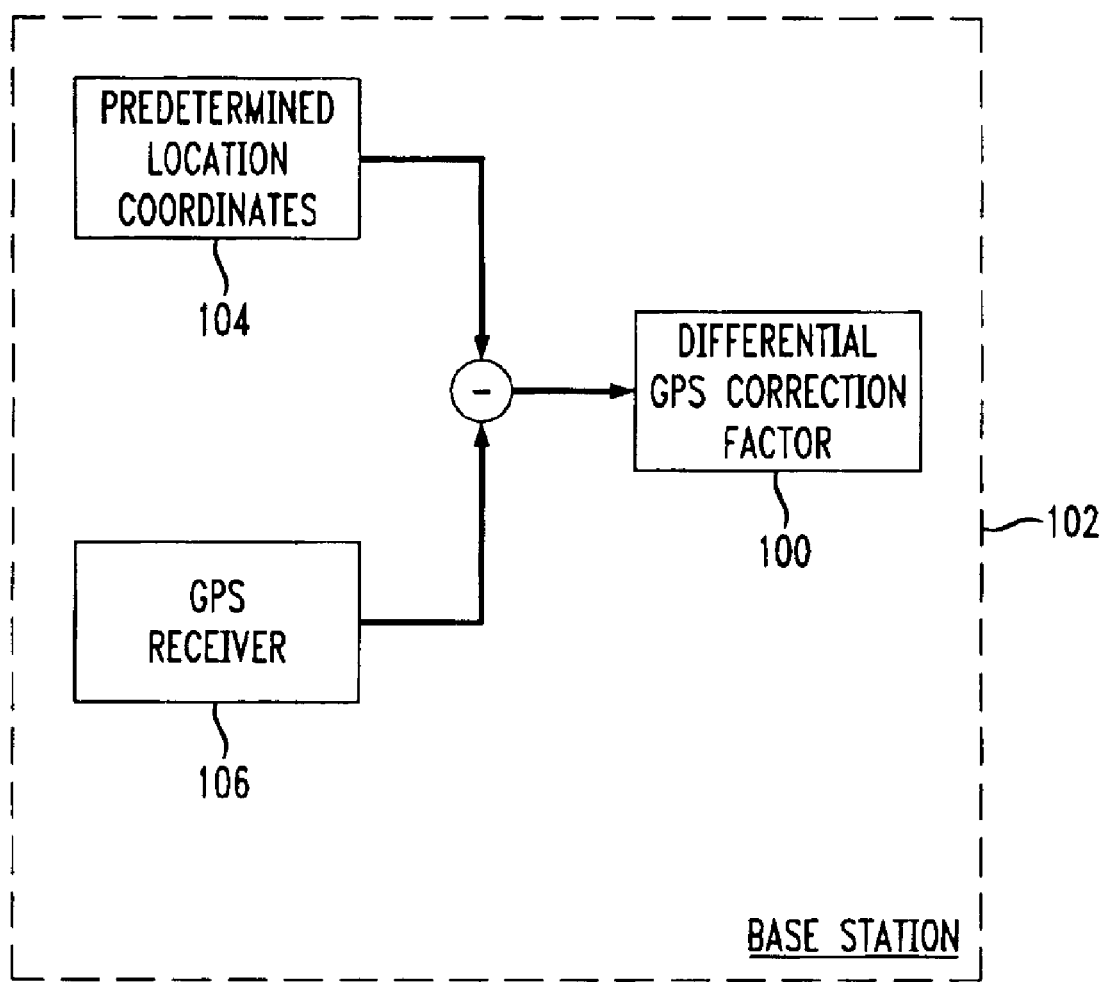
FIG. 1 is a block diagram of the relevant portion of a wireless system base station showing the combination of predetermined location coordinates such as longitude, latitude, and/or altitude, with information received by a navigational satellite system receiver such as a GPS or GLONASS receiver, to formulate a differential GPS correction factor for use by cellular telephones, in accordance with the principles of the present invention.

The present invention relates to the implementation of a differential GPS or GLONASS system (collectively referred to herein as a 'GPS system') for use by a base station of a wireless telephone system (e.g., by a cellular telephone base station). The differential GPS system may be implemented in a base station or other convenient location for use by the base station in servicing users in communication with the base station. Using the differential GPS system, a differential location 'correction' factor is determined based on a difference between a received GPS location signal and a known fixed location of a GPS system receiver for the base station. A differential GPS correction signal containing the correction factor is transmitted to any or all cellular telephone users of that base station to allow the cellular telephones to improve the accuracy of location information independently measured by GPS receivers located in each of the cellular telephones. The differential GPS correction signal may be transmitted using a voice channel or a control channel of a particular connection, or using a separate broadcast channel to all users.

In accordance with the principles of the present invention, the differential GPS correction signal containing the correction factor is received by the cellular functionality of a cellular telephone, and combined with the location information determined by the GPS functionality of the cellular telephone, to provide highly accurate location information determined by the cellular telephone.

The differential GPS signal may be used to increase the accuracy of the GPS system, whatever the current accuracy of the GPS system, allowing practical implementation of an emergency telephone system such as a 911 system using a wireless system such as a cellular telephone system.

As integrated circuit (IC) technology becomes more advanced, it has become possible to combine the base-band functions (and maybe even the RF functions in the future) of both a cellular telephone and a GPS receiver into the same or a small number of ICs, which in turn are implemented into a cellular telephone/GPS handset. Such cellular telephone handsets include both cellular telephone functions and/or GPS system related services. For instance, the GPS portion of the cellular telephone/GPS handset may be used for providing conventionally accurate (e.g., 10–15 meters) location information for use in, e.g., hiking, bicycling, or other travels.

In accordance with the principles of the present invention, when using the cellular telephone/GPS handset as a cellular telephone, a base station (e.g., the base station in communication with the cellular telephone/GPS handset) transmits a differential GPS correction signal to the cellular telephone/GPS handset to 'correct' for inaccuracy in GPS signals which are independently received by the cellular telephone/GPS handset.

Furthermore, the invention relates to the implementation of a differential GPS device using a correction factor received over a wireless communications system (e.g., using a cellular telephone channel) to improve the accuracy of the GPS system to, e.g., within a few meters or less.

FIG. 1 is a block diagram of the relevant portion of a wireless system base station showing the combination of predetermined location coordinates such as longitude, latitude, and/or altitude, with information received by a navigational satellite system receiver such as a GPS or GLONASS receiver, to formulate a differential GPS correction factor for use by cellular telephones, in accordance with the principles of the present invention.

In particular, in FIG. 1, a base station 102 of a wireless communications system (e.g., a cellular telephone system) includes a navigational satellite system receiver such as a GPS receiver 106. The base station 102 also includes storage for predetermined location coordinates 104. The predetermined location coordinates 104 are determined using conventional techniques, e.g., using surveying techniques. The predetermined location coordinates 104 may include longitude information, latitude information, and/or altitude information regarding the precise location of the antenna of the GPS receiver 106.

The longitude information, latitude information, and/or altitude information stored as the predetermined location coordinates 104 are preferably of high accuracy, e.g., to within less than one (1) meter, although the particular accuracy of the predetermined location coordinates should be determined based on the particular application.

The GPS receiver 106 of the base station 102 is preferably fixed, i.e., not movable, such that the predetermined location coordinates 104 will not change.

A differential GPS correction factor 100 is determined by the base station 102 based on a difference between location information received by the fixed GPS receiver 106 at the base station 102 and the known, highly accurate location information stored in the predetermined location coordinates 104 of the base station 102. This differential GPS correction factor 100 is transmitted to any or all cellular telephone handsets including GPS positioning capability serviced by the base station.

Figure 2:
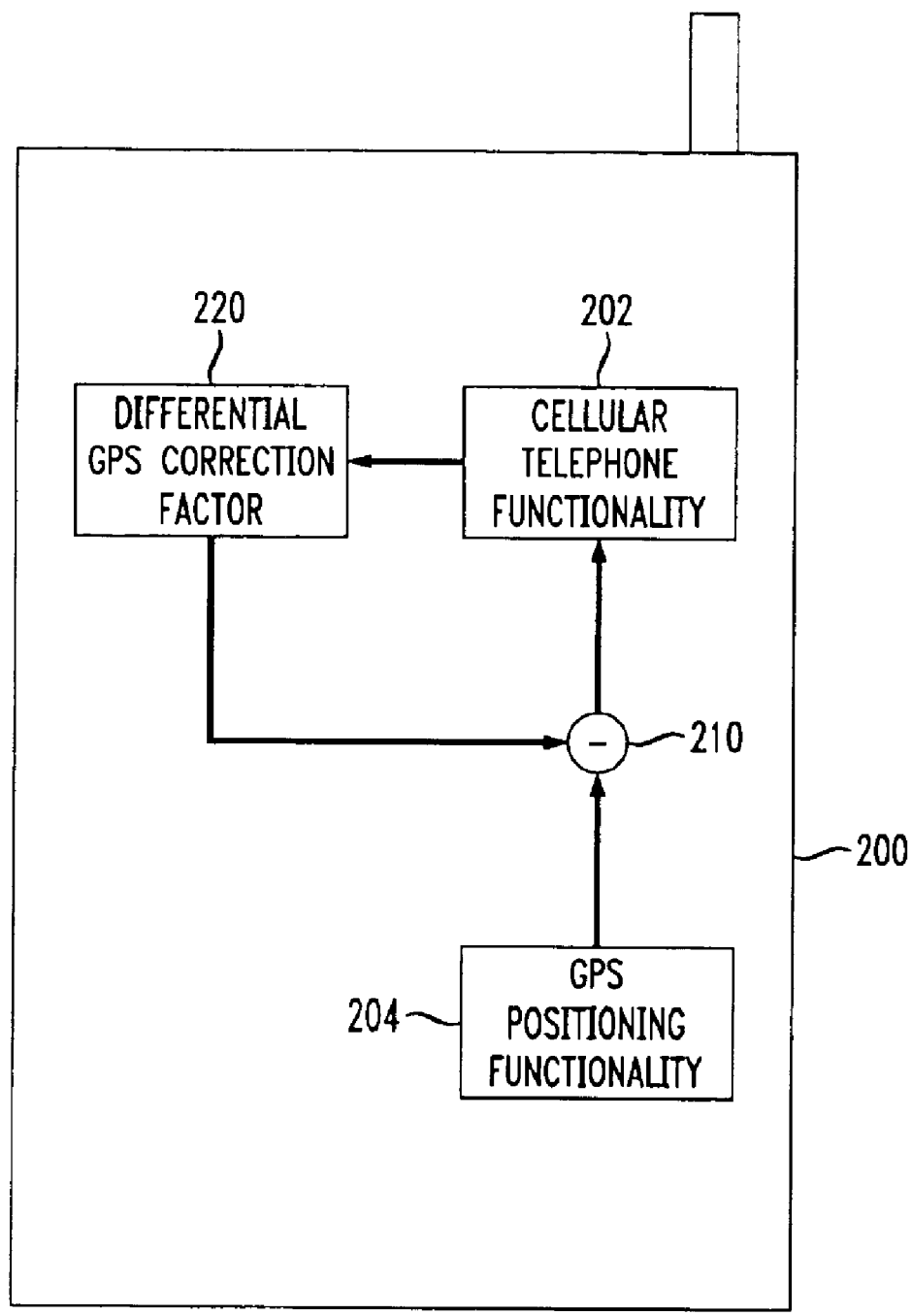
FIG. 2 is a block diagram of a wireless communications device such as a cellular telephone including a storage area for a differential GPS correction factor received using cellular telephone functionality, and the combination of the differential GPS correction factor with a location determined by a GPS system, in accordance with the principles of the present invention.
Figure 3:
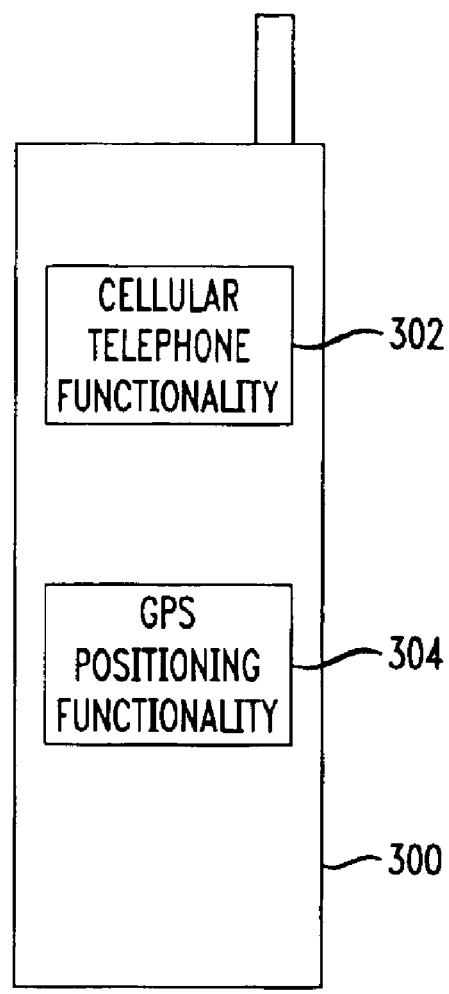
FIG. 3 shows a conventional cellular telephone including cellular telephone functionality combined with a GPS system.

FIG. 2 is a block diagram of a wireless communications device such as a cellular telephone 200 including a storage area for a differential GPS correction factor 220 received using cellular telephone functionality, and the combination of the differential GPS correction factor 220 with a location determined by a GPS system, in accordance with the principles of the present invention.

In particular, the differential GPS correction factor 100 transmitted by the base station 102 is received by cellular telephone functionality 202 in a cellular telephone 200 and stored in an appropriate location. The differential GPS correction factor 220 is combined with current location information determined by a GPS system 204 using an appropriate combiner 210 to provide highly accurate location information to the cellular telephone module 202. The cellular telephone module 202 may use the highly accurate location information, e.g., to provide exact location information to emergency personnel using, e.g., a 911 emergency telephone call. The highly accurate location information may be transmitted to the emergency bureau either in using the voice channel and/or a control channel.

The differential GPS correction factor 100 may be transmitted by the base station 102 to all active cellular telephones 200. Alternatively, the differential GPS correction factor 100 may be reserved for use by users of the wireless communications system only for particular needs, e.g., during 911 telephone calls.

Moreover, the differential GPS correction factor 100 may be transmitted any number of times to a particular user's cellular telephone 200. For instance, the differential GPS correction factor 100 may be transmitted to the cellular telephone/GPS receiver 200 once with respect to any particular telephone call. For instance, the differential GPS correction factor 100 may be transmitted to the cellular telephone 200 during call setup with the base station 102, or at some other appropriate time during the telephone call. The differential GPS correction factor 100 determined by the base station 102 is stored in an appropriate location 220 in the cellular telephone 200. A one-time transmission of the differential GPS correction factor 100 (with respect to a single telephone call) may be appropriate if the accuracy of the GPS system in general is not frequently changing. Alternatively, a broadcast channel can be used to periodically or otherwise transmit the differential GPS correction factor 100.

If the accuracy of the GPS system is subject to frequent changes, it may be preferred that the differential GPS correction factor 100 be transmitted to active cellular telephone/GPS receivers 200 on a more frequent basis, e.g., periodically during any particular telephone call (e.g., during 911 telephone calls). For instance, the differential GPS correction factor 100 may be calculated by the base station 102 periodically (e.g., once every second, once every few seconds, etc.), and transmitted to any or all cellular telephones 200 active at that time. Thus, more frequent changes in the accuracy of the GPS system due, e.g., to selective availability, changes in the ionosphere delay effect, etc., can be accommodated in accordance with the principles of the present invention to provide a cellular telephone handset 200 with highly accurate location information for use by, e.g., emergency personnel in relation to a 911 telephone call.

Use of the present invention is not limited to transmission of location information for the purposes of an emergency telephone call or for the implementation of a differential GPS system. Indeed, the principles of the present invention can be utilized to provide improved location information in a variety of applications, e.g., to transmit a location of a child using the telephone to a parent at the opposite end of a telephone call.

The disclosed embodiments were described with respect to a differential GPS correction factor 100 determined by a servicing base station 102 in a wireless communications system. However, the principles of the present invention relate equally to a differential GPS correction factor 100 determined by a device separate from the base station 102 and communicated to the base station 102 for relay to active cellular telephones 200.

A database of geological corrections may also be made available to a servicing or other base station 102 in a wireless telephone system to enable an even more accurate differential GPS correction factor 100 to be transmitted for storage and/or use in correcting location information determined by a cellular telephone/GPS receiver 200.

While the invention has been described with reference to the exemplary embodiments thereof, those skilled in the art will be able to make various modifications to the described embodiments of the invention without departing from the true spirit and scope of the invention.

What is claimed is:

1. In a wireless communications system, a location determining system comprising:

a first GPS receiver in a fixed location relative to base station, exact location coordinates of said first GPS receiver being fixed and predetermined;

a local error determination module to determine a local error difference between a raw GPS location determined by said first GPS receiver and said predetermined exact location coordinates;

a second GPS receiver in a mobile device;

a combiner to combine said local error difference with a raw GPS location signal determined by said mobile device to produce an error corrected GPS location signal accurate to within a few meters; and a transmitter for transmitting said error corrected GPS location signal from said mobile device during a telephone call.

2. In a wireless communications system, a location determining system according to claim 1, wherein:

said first GPS receiver and said second GPS receiver operate in a GLONASS system.

3. In a wireless communications system, a location determining system according to claim 1, further comprising:

a database containing at least one geological correction with respect to said determination of said local error difference.

4. In a wireless communications system, a location determining system according to claim 1, wherein said mobile device comprises:

a cellular telephone handset.

5. In a wireless communications system, a location determining system according to claim 1, wherein said local error difference comprises:

a longitude difference; and a latitude difference.

6. In a wireless communications system, a location determining system according to claim 5, wherein said local error difference further comprises:

an altitude difference.

7. A method of improving an accuracy of a GPS location in a wireless handset, comprising:

receiving location information from a navigational satellite system to determine a mobile GPS location in said wireless handset;

determining a local GPS error difference based on a difference between a raw GPS location determined by a fixed GPS receiver, and known exact location coordinates of said fixed GPS receiver;

transmitting wirelessly said local GPS error difference from a base station to said wireless handset;

combining at said wireless handset a raw GPS location determined by said mobile GPS location and said local GPS error difference to generate an error corrected GPS location signal accurate to within a few meters; and transmitting said error corrected GPS location signal from said wireless handset during a telephone call.

8. The method of improving an accuracy of a GPS location in a wireless handset according to claim 7, further comprising:

transmitting said highly accurate location information from said wireless handset to a called party during an emergency telephone call.

9. The method of improving an accuracy of GPS location in a wireless handset according to claim 8, wherein:

said emergency telephone call is an E-911 telephone call.

10. Apparatus for improving an accuracy of a GPS location in a wireless handset, comprising:

means for receiving location information from a navigational satellite system to determine a mobile GPS location in said wireless handset;

means for determining a local GPS error difference based on a difference between a raw GPS location determined by a fixed GPS receiver, and known exact location coordinates of said fixed GPS receiver;

means for transmitting wirelessly said local GPS error difference from a base station to said wireless handset;

means for combining at said wireless handset a raw GPS location determined by said mobile GPS location and said local GPS error difference to generate an error corrected GPS location signal accurate to within a few meters; and means for transmitting said error corrected GPS location signal from said wireless handset during a telephone call.

11. The apparatus for improving an accuracy of a GPS location in a wireless handset according to claim 10, further comprising:

means for transmitting said highly accurate location information from said wireless handset to a called party during an emergency telephone call.

12. The apparatus for improving an accuracy of a GPS location in a wireless handset according to claim 11, wherein:

said emergency telephone call is an E-911 telephone call.

13. A method of increasing accuracy of a navigational satellite system in a mobile wireless communications device, comprising:

receiving using cellular telephone functionality of said mobile wireless communications device a local error difference;

determining a raw GPS location of said mobile wireless communications device using a GPS system in said wireless communications device;

combining said local error difference with said determined raw GPS location of said mobile wireless communications device to produce an error corrected GPS location signal accurate to within a few meters; and transmitting said error corrected GPS location signal from said mobile wireless communication device during a telephone call.

14. The method of increasing accuracy of a navigational satellite system in a mobile wireless communications device according to claim 13, wherein said local error difference comprises:

a longitude correction; and a latitude correction.

15. The method of increasing accuracy of a navigational satellite system in a mobile wireless communications device according to claim 14, wherein said local error difference further comprises:

an altitude correction.

16. A mobile wireless device, comprising:

a satellite positioning system receiver;

a wireless communications front end; and a combiner module adapted to combine a local error difference with a raw GPS location signal determined by said mobile wireless device to produce an error corrected GPS location signal accurate to within a few meters, and to output during a telephone call said error corrected GPS location signal from said mobile wireless device, said local error difference being determined external to said mobile wireless device by a fixed GPS receiver and wirelessly transmitted to said mobile wireless device.

17. The mobile wireless device according to claim 16, wherein:

said local error difference includes longitude and latitude information.

18. The mobile wireless device according to claim 16, wherein:

said satellite positioning system receiver is a GPS receiver.

19. The mobile wireless device according to claim 16, wherein:

said wireless communications front end is a cellular telephone.

* * * * *